United States Patent

[11] 3,587,407

| [72] | Inventor | Andy R. Wilson, Jr.<br>Los Alamos, N. Mex. |
|---|---|---|
| [21] | Appl. No. | 834,295 |
| [22] | Filed | June 18, 1969 |
| [45] | Patented | June 28, 1971 |

[54] SELF-PRESSURE GENERATING FLUID-POWERED ACTUATOR
9 Claims, 4 Drawing Figs.

[52] U.S. Cl. ............................................. 92/82,
91/422, 92/83, 92/112, 92/157(D.O.),
92/160(D.O.)
[51] Int. Cl. ............................................. F15b 3/00
[50] Field of Search ............................................. 92/82, 83,
110, 111, 112, 165, 168, 184, 182, 157, 154, 158,
159, 160, 156, 183; 91/422; 277/(Inquired)

[56] References Cited
UNITED STATES PATENTS

| 2,201,571 | 5/1940 | Aikman | 92/159X |
|---|---|---|---|
| 2,570,647 | 10/1951 | Cormier | 92/82X |
| 2,918,903 | 12/1959 | Geyer | 92/111X |
| 2,968,287 | 1/1961 | Creighton | 92/133X |
| 3,168,013 | 2/1965 | Williamson | 92/168X |
| 3,230,977 | 1/1966 | Mercier | 92/183X |

Primary Examiner—Martin P. Schwadron
Assistant Examiner—Leslie J. Payne
Attorney—Watson, Cole, Grindle & Watson ABSTRACT: A self-contained fluid-powered linear actuator or cylinder using an external source of pressurized fluid for motive power and external valving for stroke reversal, means to route fluid within the device, means to automatically intensify the pressure level of a portion of the operating fluid for use as fluid bearings and fluid seals between moving parts within the device, and means to automatically replenish the intensification chambers provided therein, thereby eliminating the need for internal dynamic seals and minimizing wear of the actuator components.

INVENTOR,
ANDY R. WILSON, JR.

BY Watson, Cole, Grindle & Watson
ATTORNEYS

SELF-PRESSURE GENERATING FLUID-POWERED ACTUATOR

This invention relates generally to fluid-powered cylinders and linear actuators and more particularly to a fluid-powered cylinder using a pressurized fluid for motive power and being capable of self-elevating the pressure level of a portion of the operating fluid to a higher pressure level than that of the operating fluid, and instantly employing the higher pressure level fluid as fluid seals and fluid bearings upon stroking of the cylinder.

In several of the hydraulic or fluid-powered actuators currently available for use, pressurized fluid is employed as a fluid bearing or bearings between moving parts in close proximity to one another within the actuator. A source of pressurized fluid, independent of the device for motive power, is usually provided along with independent valving means for determining the direction of movement of the device. Also, external conductors as well as internal passages are relied on for directing pressurized fluid to the fluid bearing areas and to direct exhaust fluid to lower pressure areas. Most of these prior art devices, therefore, rely on a source of pressurized fluid remote from the device to provide the pressurized fluid that is used as fluid bearings within the device.

On the other hand, other devices of this type have been known to divert a small portion of the pressurized inlet fluid, normally used to extend or retract the actuator, to achieve a cooling effect on the piston rod while, however, continuing to employ the use of conventional sealing devices such as metallic piston rings, U-cups and chevron seals, so that the device must operate with metal-to-metal bearing surfaces for the translating piston rod. By their very nature, these devices require constant internal lubrication and replacement of conventional sealing devices and other components. Also, the internal nonmetallic seals render these devices unreliable especially during extended periods of use or in extreme temperature conditions. Furthermore, those first-mentioned devices utilizing separate and remote sources of pressurized fluid for effecting fluid bearings are exposed to the possibility of loss or malfunction of the fluid bearings through failure of the separate and remote sources of pressurized fluid and/or failure of one or more of the complex of fluid conductors directing the pressurized fluid to and from the device. Such devices are more susceptible to failure and frequent servicing since an exposed fluid circuit is involved. Accordingly, the initial cost, routing problems, vulnerability and maintenance of this type of conductor complex is found to be less than desirable.

It is therefore an object of this invention to provide a fluid-powered cylinder or linear actuator wherein maintenance problems are substantially reduced, operating reliability is significantly improved, and service life of the actuator is greatly extended.

Another object of this invention is to provide a fluid-powered cylinder which possesses all the known advantages of using fluid bearings and fluid seals between moving parts yet avoids those disadvantages found in other known devices of this type by simply self-generating the pressurized fluid within the device itself for use as fluid bearings and as fluid seals.

A further object of the instant design is to provide a fluid-powered actuator which self-generates the pressurized fluid for use as fluid bearings and as fluid seals instantly upon commencement of, and throughout, the extending and retracting strokes of the piston so as to completely avoid the need for internal dynamic seals between moving parts, to minimize metal-to-metal contact between moving parts, and to avoid the necessity for complex external fluid circuits.

A still further object of the invention is to provide a fluid-powered linear actuator wherein means are provided for intensifying a small portion of the operating fluid in a contracting chamber at the start of the piston extension stroke so as to provide fluid bearings and fluid seals between moving parts within the self-contained device. During such movement, a small portion of the low pressure exhaust fluid is diverted to an expanding chamber so that it may be pressurized instantly upon the start of the retraction stroke of the piston and be employed as fluid bearings and fluid seals between moving parts during the reverse piston stroke. During this reverse stroke, the low pressure exhaust fluid is diverted to another expanding chamber for pressurization instantly at the beginning of the forward stroke of the actuator so as to again be employed as a fluid bearing and as a fluid seal.

Other objects, advantages and novel features of the invention will become apparent from the following detailed description of the invention when considered in conjunction with the accompanying drawings wherein.

Figure 1:
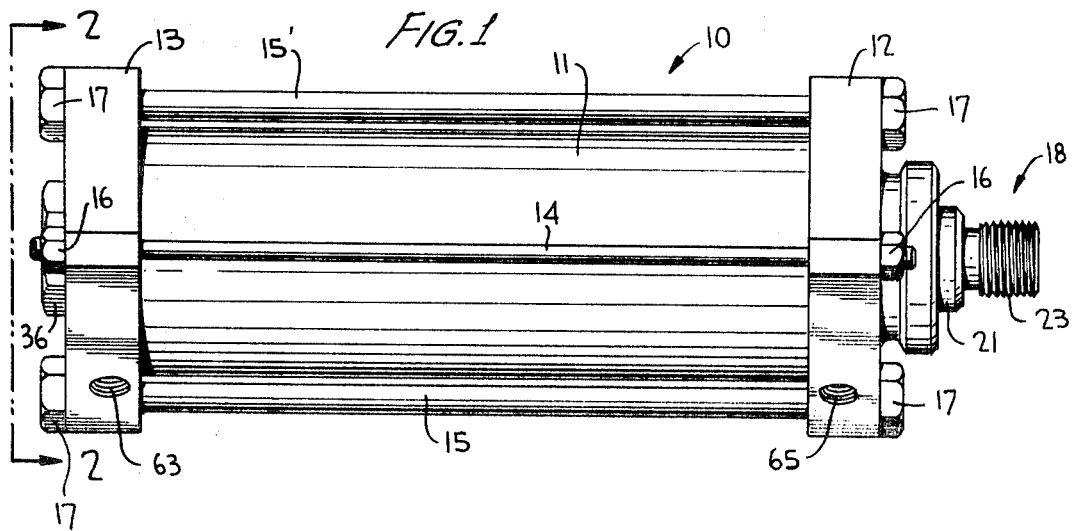
FIG. 1 is a longitudinal, side elevational view of the cylinder according to the instant design when viewed externally.
Figure 4:
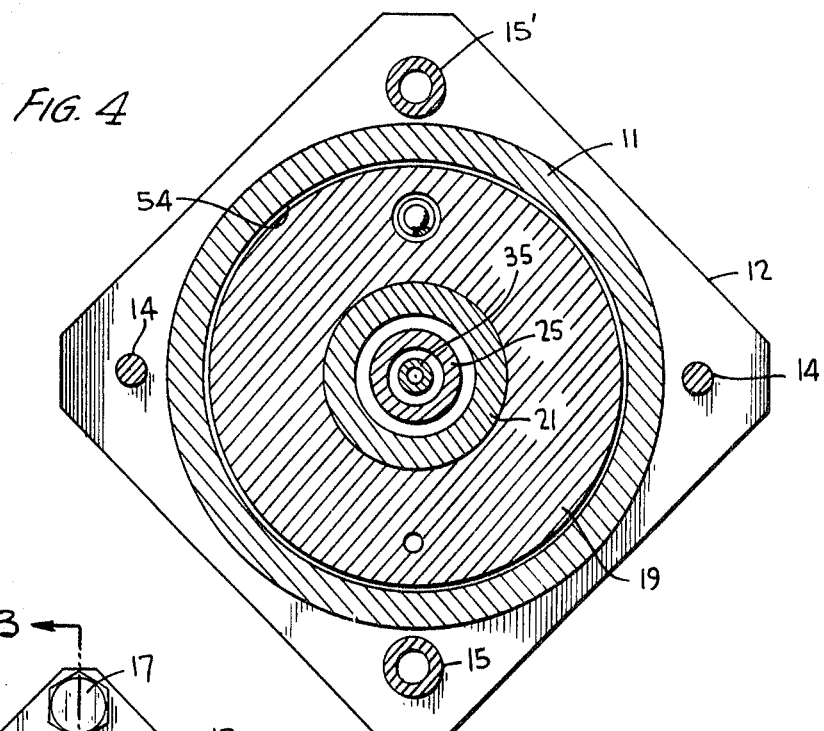
FIG. 4 is a view in transverse cross section taken substantially along the line 4—4 of FIG. 3.
Figure 2:
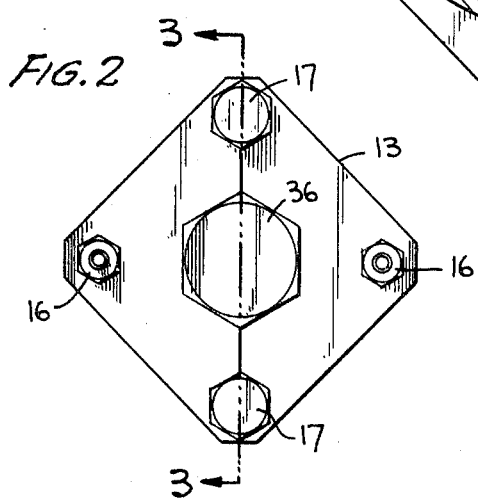
FIG. 2 is an end view of the device shown in FIG. 1 viewed in the direction of the line 2—2.
Figure 3:
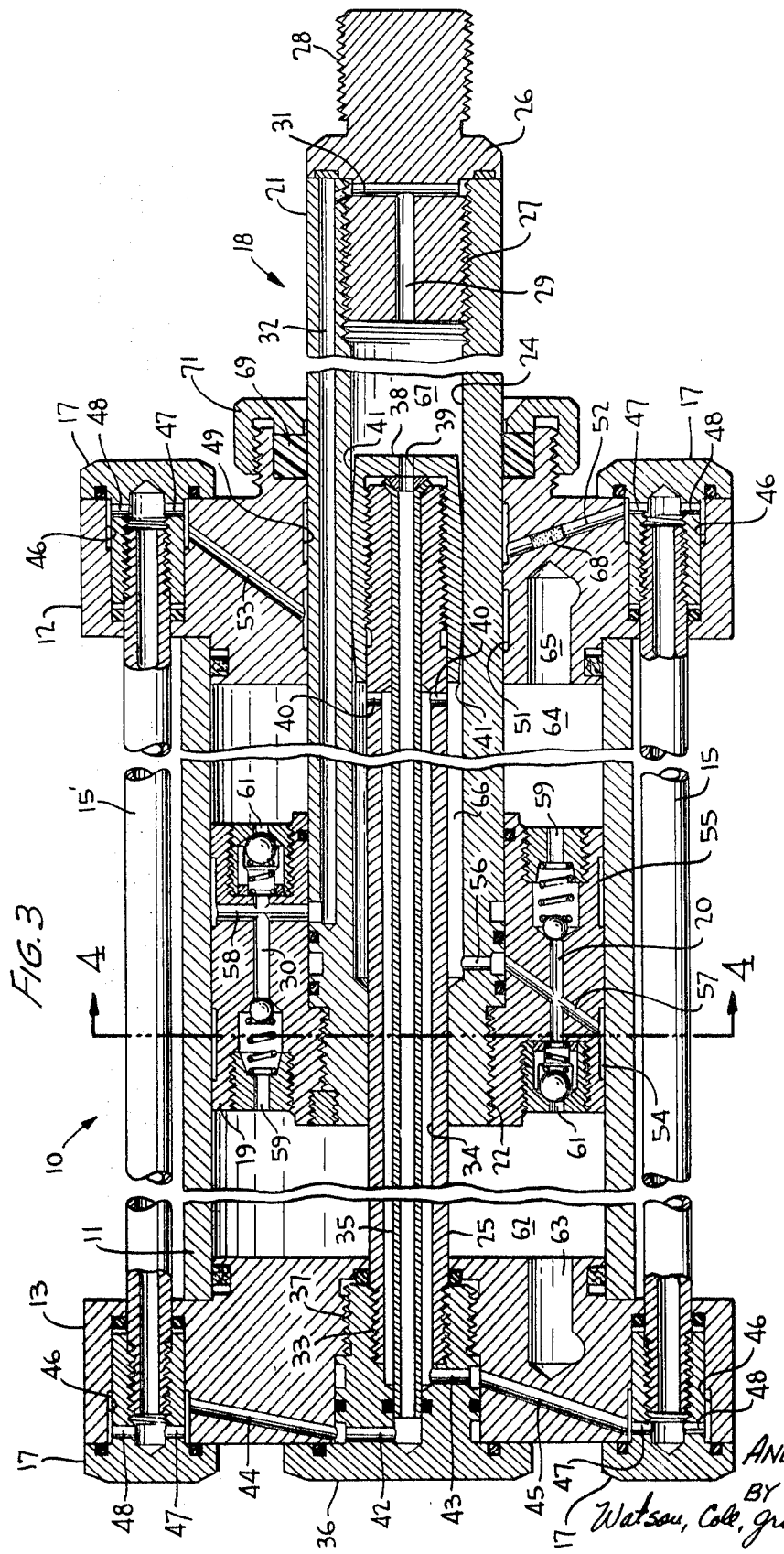
FIG. 3 is a slightly enlarged view in longitudinal cross section taken substantially along the line 3—3 of FIG. 2.

Referring now to the drawings wherein like reference characters refer to like and corresponding parts throughout the several views, there is shown a fluid-powered actuator 10 according to the instant invention which includes a right circular cylinder 11 closed at each end by a pair of similarly constructed end members 12 and 13. Each of the end members is secured to the cylinder 11 by means of a pair of tension rods 14, solid in cross section, and a pair of tension rods 15, 15' hollow in cross section. Any suitable means may be provided for the threaded ends of the solid tension rods 14, such as the conventional type of hexagonal nuts 16 shown in FIGS. 1 and 2. For the hollow tension rods 15, 15**, internally threaded fasteners 17, of the type as most clearly shown in FIG. 3, are used since they are each provided with radial passages for the purpose to be described hereinafter.

Within the bore of the cylinder 11, a reciprocal piston assembly 18 is provided for movement into and out of the cylinder in the normal manner as in any type of conventional fluid cylinder. The piston assembly 18 comprises a piston head 19 of circular cross section having an outer diameter slightly less than the inner diameter of the cylinder bore, the clearance at the interface being less than the clearance normally provided between the conventional piston head and cylinder. The piston assembly 18 also includes a piston rod 21 threadedly secured at one end, as at 22, to the piston head 19 and extending outwardly of the device through a suitably provided bore in end member 12 so as to be freely slidable therewithin. As at the interface of the piston head 19 and cylinder 11, the outer diameter of rod 21 is slightly less than the inner diameter of the end member 12.

The piston rod 21 is provided with a longitudinally extending bore 24 of constant diameter except for that portion near its secured end which is constructed to snugly embrace a rod 25 for slidable engagement therewith. The free end of the piston rod 21 is plugged with a member 26 which is threadedly secured, as at 27 to the wall of the bore 24. The plug 26 is also externally threaded as at 28 for the attachment, for example, of a fixture thereto by which means the piston rod 21 can be connected to a device (not shown) to be actuated. Also, it can be seen that the plug member 26 is provided with a pair of passages 29, 31 intercommunicating with a longitudinal passage 32 located within the cylindrical wall of the piston rod 21.

The rod 25 is threadedly secured at one end, as at 33, within a plug member 36 and is arranged axially through piston head 19 so as to terminate at its free end within bore 24 of piston rod 21. The rod 25 is also provided with a longitudinally extending bore 34 of the constant diameter except for that portion near its free end which is constructed to snugly embrace one end of a hollow rod member 35. The other end of this hollow tube 35 is permanently seated within plug member 36 which member is threadedly secured to end member 13, as at 37. A cylindrical sleeve member 38 is threaded onto the free end of fixed rod 25 and a central aperture or orifice 39 is provided in its end wall as an extension of the bore in tube 35. The sleeve 38 is tapered along its outer periphery at both ends, as can be clearly seen at 41, 41 in FIG. 3 of the drawings, for the purpose to be hereinafter described.

Radial passages 42 and 43 are provided in plug member 36 so that, when member 36 is fully seated, passage 42 will interconnect the bore of tube 35 with a passage 44 provided in end member 13, and passage 43 will interconnect bore 34 of fixed rod 25 with a passage 45 provided also in the end member 13. A counterbore 46 provided in the vicinity of each of the fastener members 17 on member 13, and radial passages 47, 48 in each of these fasteners 17 serve to interconnect the hollow bore of each of the tension rods 15 with the passages 44 and 45, respectively.

In order to provide fluid bearings at the interface of the end member 12 and the piston rod 21, annular spaces or grooves 49, 51 are provided in the bore of end member 12. Counterbore 46 is also provided in member 12 in the vicinity of fasteners 17, and each of these fasteners is provided with radial passages 47, 48 similar to those described for fasteners 17 on end member 13. Passages 52 and 53 are also provided in end member 12 so that the bore within tension rod members 15, 15' may interconnect with grooves 49, 51, respectively.

In order to provide fluid bearings and fluid seals at the interface of the piston head 19 and cylinder 11, a pair of suitably shaped annular spaces or grooves 54, 55 are provided in the outer cylindrical wall of pistonhead 19. A radial passage 56 is provided in the wall of piston rod 21 for interconnecting the bore 24 of the piston rod with a passage 57 provided in piston head 19, with passage 57 terminates into groove 54. Also, a passage 58 provided in piston head 19 interconnects longitudinal passage 32 in the piston rod with annular groove 55.

One side of pistonhead 19 is provided with a pressure control valve 59 and a low pressure check valve 61. Similarly, a pressure control valve 59 and a low pressure check valve 61 are provided on the other side of piston head 19 in such a manner that the opposing valves 59, 61 on opposite faces of the head 19 interconnect, via passages 20 and 30, in intersecting relationship with the passages 57 and 58, respectively. It should be noted that each of these valves is provided with a valve seat and a ball member urged against the seat by means of a compression spring so that each of the valves 61 are caused to open as a result of pressure from opposite sides of the pistonhead whereas each of the valves 59 are caused to open from pressure within pistonhead 19. Also, it should be noted that radial passages 40 are provided in the wall of rod 25 thereby interconnecting bores 24 and 34 of rod member 21 and rod 25, respectively.

In order to extend piston assembly 18 out of cylinder 11, pressurized fluid is induced into a chamber 62 which is defined by cylinder 11 and the facing end walls of members 13 and 19. Such pressurized fluid is delivered to chamber 62 of the device through passage 63 in end member 13 so that outward movement of the piston assembly will be commenced as the chamber 62 begins to expand. A chamber 64, defined by cylinder 11 and the facing end walls of members 12 and 19, is vented to the exterior of the device through a passage 65 in end member 12. Accordingly, as the extended movement commences, a major portion of the fluid which may be entrapped within chamber 64 is permitted to exhaust through passage 65 as chamber 64 decreases in volume. Simultaneously with such movement, pressure level of the fluid entrapped in chamber 66 (this chamber being defined by the central bore 24, the fixed rod and the sleeve 36) is immediately intensified because of the movement of piston assembly 18 with respect to the fixed sleeve thereby decreasing the volume of chamber 66. It should be noted here that the low pressure check valve 61 facing the chamber 62 is designed to be opened at a much lower pressure than that of the inlet fluid entering at passage 63. Therefore, at the initial start of the extended movement, entrapped fluid will be permitted to enter chamber 66 through passages 20, 57 and 56 so as to be entrapped therein. As the volume of chamber 66 decreases, the pressure of fluid therein is permitted to increase to a suitable pressure level which is higher than the pressure level of the external fluid induced into chamber 62. This intensified fluid pressure level in chamber 66 is determined by the combination check valve and pressure control valve 59 which faces chamber 64. The low pressure check valve 61 is now firmly seated by the higher pressure in passage 57 and the high pressure fluid from chamber 66 pressurizes the fluid in annular or circumferential grooves 54 and 49 through passages 57 and 52, respectively, it being noted that chamber 66 communicates with passage 52 through 40, 34, 43, 45, 46, and the counterbores 46 and radial passages 47, 48 at either end of rod 15 along with the bore in rod 15. The high pressure fluid in the grooves or spaces 54 and 49, acting as fluid bearings, cause the piston assembly to assume a central position within the bore of cylinder 11 and within the bore of end member 12. Accordingly, contact of piston rod 21 with the bore end member 12 and contact of the pistonhead 19 with the bore of cylinder 11 is prevented during motion of the piston assembly 18 to the right in an extended position.

In addition, since the fluid in the circumferential groove 54 is now at a higher pressure level than the fluid in chamber 62, this higher pressure serves as a seal or fluid packing to prevent the fluid in chamber 62 from bypassing pistonhead 19 and entering chamber 64. Excess fluid in chamber 66, that is not required to keep grooves 54 and 49 pressurized, is permitted to flow into chamber 64 through pressure control valve 59. It should be noted that, although the clearance between pistonhead 19 and cylinder 11, and between piston rod 21 and the axial bore in end member 12 is sufficient to permit the assembly 18 to be adequately centered during movement, these clearances are suitably small so as to prevent excessive fluid flow from grooves 54 and 49 into adjacent chambers.

Another chamber, designated as 67, is also utilized during the extension stroke of piston assembly 18. This chamber is defined by the bore 24 of piston rod 21, the end of sleeve 38 and the end face of plug member 26. As piston assembly 18 extends, an amount of pressure of fluid being displaced in chamber 64 opens the low pressure check valve 61 which faces this chamber. Opening of this valve, via passages 29, 31, 58 and 30, is assisted by the vacuum effect created by expansion of chamber 67. Accordingly, replenishing fluid flows from chamber 64 through check valve 61 and into chamber 67 through the interconnecting passages as above noted. The chamber 67 is thereby recharged with fluid for the pressure intensification stroke which occurs therein when the piston assembly retract stroke commences.

For the retracting operation of piston assembly 18, external pressurized fluid is induced into chamber 64 through passage 65 thereby causing chamber 64 to expand and pistonhead 19 to begin a retracted movement toward the left as seen in FIG. 3. At the beginning of such movement, the major portion of fluid in chamber 62 is permitted to exhaust through passage 63 at a low pressure. Upon retracted movement of piston assembly 18, the pressure level of fluid entrapped in chamber 67 is immediately intensified because of the movement of piston rod 21 and its plug member 26 in relation to the fixed rod 25 and cylindrical sleeve 38 thereon. The pressure of the fluid in chamber 67 is permitted to increase to a suitable pressure level that is higher than the pressure level of the external fluid induced into chamber 64. This intensified fluid pressure level in chamber 67 is determined by the combination check valve and pressure control valve 59 which faces chamber 62. This valve, as well as its opposing low pressure check valve 61 which faces chamber 64, are in communication with chamber 67 through passages 30, 58, 32, 31 and 29. Valve 61 is, therefore, firmly seated in a closed position by the higher pressure in passage 58. The high pressure fluid from chamber 67 pressurizes the fluid in annular or circumferential grooves 55 and 51 through passages 58 and 53, respectively, it being noted that passage 53 is in communication with counterbore 46, and passages 47, 48 at either end of the rod 15', the bore in tension rod 15', passages 44, 42, the bore of fixed rod 35, and the orifice 39. The high pressure fluid in grooves 55 and 49, acting as fluid bearings in these grooves, cause assembly 18 to assume a central position within their respective bores, thereby preventing contact of pistonhead 19 with the bore of cylinder 11 and preventing contact of piston rod 21 with the bore of end member 12, whenever piston assembly 18 is in motion to the left during its retraction stroke. In addition, since the fluid in groove 55 is at a higher pressure level than the fluid in chamber 64, groove 55 serves as a fluid seal or fluid packing to prevent the fluid in chamber 64 from bypassing piston head 19 and entering chamber 62. Excess fluid in chamber 67, which is not required to keep grooves 55 and 51 pressurized, is permitted to flow into chamber 62 through the pressure control valve 59 which faces chamber 62. Although the clearance between pistonhead 19 and cylinder 11 and between piston rod 21 and the axial bore of end member 12 is sufficient to permit the assembly 18 to be adequately centered during movement, these clearances are suitably small so as to prevent excessive fluid flow from grooves 55 and 51 into adjacent chambers. As assembly 18 retracts, the pressure of the fluid being displaced in chamber 62 opens the low pressure check valve 61 which faces that chamber. This opening is assisted by the vacuum effect created by the expansion of chamber 66, via passages 56, 57 and 20, replenishing fluid flows from chamber 62 through check valve 61 which faces that chamber and into chamber 66 so as to recharge this chamber with fluid for the pressure intensification stroke that occurs in chamber 66 when the piston assembly extension stroke once again commences.

The cylindrical sleeve member 38, which remains in a fixed relation with respect to moving piston assembly 18, is not provided with circumferential grooves for the purpose of fluid bearings as in the case of pistonhead 19 and the end member 12. However, the sleeve member 38 is tapered at its periphery at both its ends, as shown at 41, 41, so that the high pressure fluid in chamber 67 during the retraction stroke will exert a centralizing effect on the sleeve member 38 as a small portion of this fluid bypasses the sleeve between the alternating pressure intensifier chambers 66 and 67, thereby preventing metal-to-metal contact of the sleeve 38 with the bore 24 of the piston rod 21 during operation.

Fixed rod 25 and sleeve member 38, as shown, provide two longitudinal passages throughout the length of a long axially loaded column of small diameter. The central tube 35, flared and clamped at one end and telescoped into a cylindrical recess at its other end within the plug member 36, transmits pressurized fluid from intensification chamber 67 to end member 13 where the fluid is routed through 42, 44, 46, 47, 48, the bore in rod member 15', passages 47, 48, counterbore 46, to passage 53 and then to groove 51. An annular passage, formed by the central tube 35 and the bore 34 in the rod member 25, transmits pressurized fluid from intensification chamber 66 through passages 40 and to end member 13 where the fluid is routed through passages 43, 45, counterbore 46, passages 47, 48, the bore in the hollow tension rod member 15, counterbore 46, passages 47, 48, counterbore 46, to passage 52 and then to groove 49. In this fashion, the circumferential grooves 51 and 49 in end member 12 are supplied alternatively with pressurized fluid, groove 49 being pressurized during cylinder extension, and groove 51 being pressurized during cylinder retraction.

It is evident that the specific design of end members 12 and 13, the means of attaching the end members to the cylinder 11, and the means of transmitting pressurized fluid to the grooves 49 and 51 may be varied by other suitable means without affecting the scope of the invention.

The suitably shaped circumferential grooves 54 and 55 in piston head 19 are provided in lieu of a single circumferential groove in order to simplify the network of fluid passages and to minimize the number of valves required in the cylinder. It is evident, however, that a single circumferential groove may be provided in piston head 19 in lieu of the two circumferential grooves so long as suitable additional passages and valves are provided to cause pressurized fluid from chamber 66 during extension of the piston assembly 18, or pressurized fluid from chamber 67 during piston assembly retraction, to pressurize a single circumferential groove in piston head 19. The two suitably shaped circumferential grooves 49 and 51 in the end member 12 may also be replaced by a single groove single groove, so long as additional passages and valves are provided. Again, it is evident that more than two suitably shaped circumferential grooves may be provided in piston head 19 and/or in end member 12.

It should be pointed out that the use of a device such as a restrictor 68 in passage 52 may be provided to improve the performance of fluid bearings. Also, such a restricted orifice means may also be provided in the passages 53, 57 or 58, if desired. Also, devices such as integral cushions, rate control valves, deceleration valves, air vents, etc., as commonly utilized with conventional cylinders, may also be used with this invention.

The only dynamic seal utilized with this invention is a nonmetallic seal ring 69 provided at the exterior face of the end member 12 and removable by means of a threaded collar member 71. In this way, the seal or wiper member 69 may be easily adjusted to compensate for wear or replaced after a long period of use without disassembly of the fluid-powered cylinder itself.

In view of the foregoing description, it can be seen that a fluid-powered cylinder or linear actuator has been devised in a manner requiring only a minimum of maintenance and replacement of parts. Because of its simplified design and its ability to self-generate pressurized fluid for use as fluid bearings and as fluid seals between moving parts within the device, the invention may be used to replace those cylinders being currently used in a wide variety of application. For example, in injection-molding machines, low speed presses, machine tools, and mass production transfer lines it is desirable for internal friction of the cylinders to be at a minimum in order to insure smooth starting and uniform feed rates. Also, the instant invention will find widespread use in extremely low and high temperature environments since there is no need to replace positive contact internal dynamic seals as in conventional cylinders which only deteriorate and produce byproducts which reduce the operating efficiency of the cylinder. Also, in high pressure environments, the ordinary sealing materials such as rubber and plastic are not suitable in the extremely high pressure ranges. Since the instant invention does not require the use of internal dynamic seals, it will be able to operate at pressures limited only by the capability of the external rod packing, the valve spring design, and the pressure vessel to withstand the internal pressure. All static seals in the instant device disclosed (but not labeled) between nonmoving parts, may be of the metallic type which are available today for extremely high pressures. In those areas where fluid cylinders must be used, but where access to them for servicing is very costly and difficult and even impossible, those cylinders requiring internal dynamic seals are tremendously burdensome because servicing or replacement of the cylinders require extended periods of costly downtime of the equipment. In the case of cylinders having bores of large diameters, the cost of dismantling and reassembling these large cylinders and the replacement of parts is expensive and costly. In hot gas circuits and oil-free pneumatic circuits, it is required that a cylinder be able to operate without the benefit of lubrication normally provided by the operating fluid itself. The pressurized fluid seal employed by the instant design will operate with dry air or hot gases as effectively as it does with oils. The instant design is also suitable for heavy transport equipment, off-the-road vehicles, and deceleration devices for moving masses. As a shock absorber, the instant device would need to be modified as having a closed loop between cylinder chambers and a small integral fluid reservoir. In addition, it would be necessary to change the pressure and bypass valve arrangement and the porting within the piston since the cylinder would be absorbing forces rather than exerting force. The use of self-generated high pressure fluid sealing would, of course, still be the primary advantage over positive contact seals in conventional shock absorbers. As such, every application of a conventional cylinder that is equipped with metal piston rings is a potential application for a cylinder of the instant design.

As with conventional cylinders, the instant design will operate at the minimum pressure level required to overcome internal friction and cause motion with the only additional requirement being that additional adequate pressure must be applied at inlets 63 or 65 to cause the fluid in chambers 66 and 67 to be raised to a sufficiently high level to cause the pressure control valves 59 to unseat and permit cylinder motion by bypassing excess pressurized fluid.

The pressure control valves 59 are designed to open at a pressure level that is higher than the pressure level of the operating fluid in chambers 62 or 64, and at a pressure level that will cause piston head 19 to center within cylinder 11 with sufficient centering force to overcome all forces tending to cause pistonhead 19 to come into contact with cylinder 11 during operation. Therefore, the operating pressure of this invention depends upon the mass to be moved and the resultant column loading to be encountered by these cylinders. Cylinders built in accordance with this invention may operate at inlet pressure levels as low as 100 p.s.i., and as high as the limitations of the pressure vessel. The minimum operating pressure level is also influenced by the ratio of the four fluid pressure areas within the cylinder, said pressure areas being located in chambers 62, 64, 66, and 67.

Obviously many modifications and variations of the present invention are possible in the light of the above teachings. It is therefore to be understood that within the scope of the appended claims the invention may be practiced otherwise than as specifically described.

I claim:

1. A fluid-powered actuator device comprising:
 a cylinder having a bore extending therethrough;
 an end member secured to each end of said cylinder;
 a reciprocable piston within the bore of said cylinder, said piston comprising a piston rod closed at its outer end and extending axially through one of said end members, said piston rod having a bore extending therethrough, said piston further comprising a piston head dividing said cylinder into first and second chambers defined by one side of said head and said one end member, and by the other side of said head and the other of said end members, respectively;
 means for dividing the bore within said piston rod into a third and fourth chamber;
 one conduit means interconnecting said third chamber within said piston rod with a first space located between said pistonhead and said cylinder and with a second space located between said one end member and the periphery of said piston rod;
 another conduit means interconnecting said fourth chamber within said piston rod with a third space located between said piston head and said cylinder and with a fourth space located between said one end member and the periphery of said piston rod; and,
 fluid inlet and outlet means for directing fluid under pressure to and from the device for directing fluid against said one and said other side of said pistonhead for respectively retracting and extending said piston, said piston rod bore dividing means causing each of said third and fourth chambers to decrease in volume during movement of said piston toward extension and retraction, respectively, whereby, during extending movement of said piston as fluid under pressure is directed against said other side of said piston, an increased amount of pressurized fluid is directed to each of said first and second spaces through said one conduit means as the volume of said third chamber decreases so as to provide fluid bearings and fluid seals between said pistonhead and said cylinder and between said one end member and said piston rod periphery and whereby, during retracting movement of said piston as fluid under pressure is directed against said one side of said piston, an increased amount of pressurized fluid is directed to each of said third and fourth spaces through said another conduit means as the volume of said fourth chamber decreases so as to provide fluid bearings and fluid seals between said pistonhead and said cylinder and between said one end member and said piston rod periphery.

2. The device according to claim 1 wherein said piston rod bore dividing means comprises a rod fixed at one end to said other end member and extending through said pistonhead and within said piston rod bore, and a cap member on the free end of said fixed rod, whereby said piston is slidable with relation to said dividing means.

3. The device according to claim 2 wherein a one-way low pressure check valve is provided on said one side and said other side of said pistonhead for allowing said third and fourth chambers to be filled with fluid at the beginning of the extension and retraction strokes, respectively, and for allowing replenishment of fluid in the expanding fourth and third chambers during extension and retraction, respectively.

4. The device according to claim 3 wherein a one-way pressure control valve is provided on said one side and said other side of said pistonhead whereby excess pressurized fluid may be directed into each said first and second chambers from said third and fourth chambers, respectively, and the fluid pressure level within said third and fourth chambers during extension and retraction, respectively, being determined by said pressure control valves thereby assuring a higher pressure level in said first and third spaces than that in said first or second chambers.

5. The device according to claim 4 wherein a pair of hollow tension rods are provided for securing said one and said other end members to said cylinder, the bore in one of said tension rods serving as part of said one conduit means and the bore in the other of said tension rods serving as part of said another conduit means.

6. The device according to claim 5 wherein said fixed rod has two longitudinal, concentric passages, the outer one of said passages communicating with said third chamber and forming another part of said one conduit means, and the inner one of said passages communicating with said fourth chamber and forming another part of said other conduit means.

7. The device according to claim 6 wherein interconnecting passages, provided in said one end member, said other end member and said pistonhead, form the remaining portions of said one conduit means and said other conduit means, respectively.

8. The device according to claim 1 wherein a rod seal and wiper means is provided between said piston rod and the exterior of said one end member.

9. The device according to claim 7 wherein a rod seal and wiper means is provided between said piston rod and the exterior of said one end member.